(12) United States Patent
Hiroi et al.

(10) Patent No.: US 10,255,938 B2
(45) Date of Patent: Apr. 9, 2019

(54) MAGNETIC RECORDING MEDIUM USING ε-IRON OXIDE PARTICLE MAGNETIC POWDER

(71) Applicant: Maxell Holdings, Ltd., Otokuni-gun, Kyoto (JP)

(72) Inventors: Toshio Hiroi, Osaka (JP); Shinji Kawakami, Osaka (JP); Kenji Tanaka, Osaka (JP)

(73) Assignee: MAXELL HOLDINGS, LTD., Kyoto (JP)

( * ) Notice: Subject to any disclaimer, the term of this patent is extended or adjusted under 35 U.S.C. 154(b) by 19 days.

(21) Appl. No.: 15/420,425

(22) Filed: Jan. 31, 2017

(65) Prior Publication Data

US 2017/0221513 A1 Aug. 3, 2017

(30) Foreign Application Priority Data

Feb. 1, 2016 (JP) .................................. 2016-017020
Dec. 19, 2016 (JP) .................................. 2016-245424

(51) Int. Cl.
*G11B 5/706* (2006.01)
*G11B 5/78* (2006.01)
(Continued)

(52) U.S. Cl.
CPC ................. *G11B 5/78* (2013.01); *G11B 5/70* (2013.01); *G11B 5/70642* (2013.01); *G11B 5/725* (2013.01); *G11B 5/00813* (2013.01)

(58) Field of Classification Search
None
See application file for complete search history.

(56) References Cited

U.S. PATENT DOCUMENTS

| 2005/0123855 A1* | 6/2005 | Hegel | C10M 105/54 |
| | | | 430/270.11 |
| 2009/0174969 A1* | 7/2009 | Tada | G11B 5/70 |
| | | | 360/324 |

(Continued)

FOREIGN PATENT DOCUMENTS

| JP | 2012-43495 A | 3/2012 |
| JP | 2014-149886 A | 8/2014 |

(Continued)

*Primary Examiner* — Kevin M Bernatz
(74) *Attorney, Agent, or Firm* — Birch, Stewart, Kolasch & Birch, LLP (57) ABSTRACT

A magnetic recording medium of the present invention includes a non-magnetic substrate, and a magnetic layer containing a magnetic powder. The magnetic powder is constituted by an ε-iron oxide powder. The magnetic layer has a squareness in a thickness direction of 0.65 or more. In a differential curve obtained by differentiating a hysteresis curve in the thickness direction of the magnetic layer, two or more peaks are present. In a case where, out of peaks in the same direction among the above-described peaks, a local maximum of a largest peak in a magnetic field range of +500 oersted [Oe] or more is taken as P1 and a local maximum of a largest peak in a magnetic field range of −500 oersted [Oe] or more and less than +500 oersted [Oe] is taken as P2, a relationship below is satisfied:

$0.25 \leq P2/P1 \leq 0.60$.

6 Claims, 4 Drawing Sheets

(51) Int. Cl.
*G11B 5/725* (2006.01)
*G11B 5/70* (2006.01)
*G11B 5/008* (2006.01)

(56) References Cited

U.S. PATENT DOCUMENTS

| | | | |
|---|---|---|---|
| 2012/0045664 A1* | 2/2012 | Tanaka | G11B 5/71 428/840.2 |
| 2014/0212693 A1* | 7/2014 | Hattori | G11B 5/7013 428/832 |
| 2015/0093600 A1 | 4/2015 | Hosoya | |
| 2015/0111066 A1 | 4/2015 | Terakawa et al. | |
| 2016/0104560 A1 | 4/2016 | Ohkoshi et al. | |
| 2016/0180875 A1 | 6/2016 | Tanaka et al. | |
| 2017/0162220 A1* | 6/2017 | Nakashio | G11B 5/70642 |
| 2017/0349448 A1* | 12/2017 | Ohkoshi | C01G 49/02 |

FOREIGN PATENT DOCUMENTS

| | | | | |
|---|---|---|---|---|
| JP | 2014149886 A | * | 8/2014 | ......... G11B 5/7013 |
| JP | 2014-224027 A | | 12/2014 | |
| JP | 2015-82329 A | | 4/2015 | |
| JP | 2015082329 A | * | 4/2015 | ............ G11B 5/70 |
| JP | 2015-91747 A | | 5/2015 | |

* cited by examiner

MAGNETIC RECORDING MEDIUM USING ε-IRON OXIDE PARTICLE MAGNETIC POWDER

BACKGROUND OF THE INVENTION

1. Field of the Invention

The present invention relates to a magnetic recording medium that is excellent in terms of output characteristics and durability.

2. Description of Related Art

As recording/reproducing methods are shifting from analog methods to digital methods, there is a demand for an improvement in the recording density of coated-type magnetic recording media in which a magnetic layer containing a magnetic powder and a binding agent is formed on a non-magnetic substrate. This demand increases every year in particular for high-density digital video tapes, computer backup tapes, and the like.

In accordance with such an improvement in the recording density, the recording wavelength is becoming shorter, and the particle size of the magnetic powder has been made smaller every year in order to respond to this short-wavelength recording. Currently, a ferromagnetic hexagonal ferrite powder having an average particle size of approximately 20 nm is realized, and magnetic recording media using this magnetic powder have been implemented (JP 2015-91747A, for example).

In order to further improve the recording density of magnetic recording media using the ferromagnetic hexagonal ferrite powder, the particle size of the ferromagnetic hexagonal ferrite powder has to be made even smaller. However, if the ferromagnetic hexagonal ferrite powder is made finer, the particle volume of the magnetic powder is reduced, which will result in a problem that the media is likely to be affected by heat fluctuation. Accordingly, heat fluctuation has to be suppressed using a magnetic substance that has high coercivity and large anisotropy energy even when the particle size is made smaller.

In light of such a situation, recently, ε-$Fe_2O_3$ has been studied as a new magnetic material for magnetic recording media, and an iron oxide nano magnetic particle powder constituted by an ε-$Fe_2O_3$ single phase having ferromagnetic characteristics even at an average particle size of 15 nm or less, and preferably 10 nm or less has been proposed (JP 2014-224027A, for example). Furthermore, magnetic recording media using ε-$Fe_2O_3$ as a magnetic powder have been proposed as well (JP 2015-82329A and JP 2014-149886A, for example).

Commonly known $Fe_2O_3$ crystal structures are constituted by a gamma (γ) phase or an alpha (α) phase, whereas ε-$Fe_2O_3$ is a crystal structure that is present therebetween, and exhibits magnetic anisotropy that is based on crystal anisotropy, and thus ε-$Fe_2O_3$ is characterized by exhibiting high coercivity even at a particle size that is as small as 10 nm or less.

However, it can be seen from a differential curve obtained by differentiating a hysteresis curve of ε-$Fe_2O_3$ that a peak appears in a magnetic field range of +500 oersted [Oe] or more and also in a magnetic field range of less than +500 oersted [Oe]. The reason for this seems to be that, since an ε-$Fe_2O_3$ magnetic powder contains not only high-coercivity components but also a magnetic powder constituted by components having different coercivities, in particular, low-coercivity components, and thus a peak appears also in a magnetic field range of less than +500 oersted [Oe]. If such a low-coercivity component is present in a magnetic layer of a magnetic recording medium, a magnetic signal cannot be recorded even if recording of the magnetic signal with a magnetic head is attempted, and thus this material is not preferable as a magnetic material to be used for magnetic recording media for high-density recording.

The present invention was made in order to solve the above-described problems in conventional techniques, and provides a magnetic recording medium that can achieve both high output characteristics and high durability, by setting, to a specific range, a ratio between a local maximum of the largest peak and a local maximum of the second largest peak in a specific range in a differential curve obtained by differentiating a hysteresis curve in a thickness direction of a magnetic layer.

SUMMARY OF THE INVENTION

The present invention is directed to a magnetic recording medium, including a non-magnetic substrate, and a magnetic layer containing a magnetic powder, wherein the magnetic powder is constituted by an ε-iron oxide powder, the magnetic layer has a squareness in a thickness direction of 0.65 or more, in a hysteresis curve in the thickness direction of the magnetic layer, in a case where a point at which, after saturation magnetization in a positive direction is reached by applying a magnetic field in the positive direction to the magnetic layer, saturation magnetization in a direction (negative direction) opposite to the positive direction is reached by applying a magnetic field in the opposite direction (negative direction) is taken as a point A, and a point at which saturation magnetization in the positive direction is reached by applying a magnetic field in the positive direction further from the point A is taken as a point B, two or more peaks are present in a differential curve obtained by differentiating the hysteresis curve from the point A to the point B, and in a case where, out of the peaks, a local maximum of a largest peak in a magnetic field range of +500 oersted [Oe] or more is taken as P1 and a local maximum of a largest peak in a magnetic field range of −500 oersted [Oe] or more and less than +500 oersted [Oe] is taken as P2, a relationship below is satisfied: $0.25 \leq P2/P1 \leq 0.60$.

According to the magnetic recording medium of the present invention, it is possible to provide a magnetic recording medium that is excellent in terms of output characteristics and durability, because a ratio between a local maximum of the largest peak and a local maximum of the second largest peak in a specific range in a differential curve obtained by differentiating a hysteresis curve as measured in a thickness direction of a magnetic layer is controlled to a specific range.

DETAILED DESCRIPTION OF THE INVENTION

A magnetic recording medium of the present invention includes a non-magnetic substrate, and a magnetic layer containing a magnetic powder. Furthermore, the magnetic powder is constituted by an ε-iron oxide powder, and the magnetic layer has a squareness in a thickness direction of 0.65 or more. Furthermore, in a hysteresis curve as measured in the thickness direction of the magnetic layer, if a point at which, after saturation magnetization in a positive direction is reached by applying a magnetic field in the positive direction to the magnetic layer, saturation magnetization in a direction (negative direction) opposite to the positive direction is reached by applying a magnetic field in the opposite direction (negative direction) is taken as a point A, and a point at which saturation magnetization in the positive direction is reached by applying a magnetic field in the positive direction further from the point A is taken as a point B, two or more peaks are present in a differential curve obtained by differentiating the hysteresis curve from the point A to the point B. In the case where, out of these peaks, a local maximum of the largest peak in a magnetic field range of +500 oersted [Oe] or more is taken as P1 and a local maximum of the largest peak in a magnetic field range of −500 oersted [Oe] or more and less than +500 oersted [Oe] is taken as P2, a relationship below is satisfied:

$$0.25 \leq P2/P1 \leq 0.60.$$

If an ε-iron oxide powder is used as the magnetic powder, the coercivity of the magnetic powder is not reduced even when setting the average particle size of the magnetic powder to 8 nm or more and 20 nm or less in order to respond to short-wavelength recording. Furthermore, the output characteristics can be improved by setting the squareness in the thickness direction of the magnetic layer to 0.65 or more, and can be further improved by setting the squareness in the thickness direction of the magnetic layer to 0.75 or more. There is no particular limitation on the method for controlling the squareness to 0.65 or more, but examples thereof include methods for performing control by changing the magnitude of the magnetic field orientation.

Furthermore, if $0.25 \leq P2/P1 \leq 0.60$, the output characteristics and the durability can be improved. Specifically, it seems that the local maximum P1 represents a proportion of a magnetic powder constituted by a high-coercivity component having a particle size of 8 nm or more and 20 nm or less, and the local maximum P2 represents a proportion of a magnetic powder constituted by a low-coercivity component having a particle size of less than 8 nm. The reason for this is as follows. That is to say, since an ε-iron oxide powder exhibits magnetocrystalline anisotropy, the coercivity of the ε-iron oxide powder is likely to be affected by the particle size, and, typically, the coercivity decreases if the particle size is small, and the coercivity increase if the particle size is large. It seems that, in particular, if the particle size of the ε-iron oxide powder becomes smaller, the coercivity suddenly decreases and is likely to be affected.

In this manner, if P2/P1 is 0.25 or more and 0.60 or less, the output characteristics of the magnetic layer are improved by a high-coercivity magnetic powder having a large particle size that is 8 nm or more and 20 nm or less. Furthermore, voids between particles constituted by the high-coercivity component having a large particle size that is 8 nm or more and 20 nm or less are filled with a low-coercivity magnetic powder having a small particle size that is less than 8 nm.

In this manner, even when voids between particles constituted by a high-coercivity component having a large particle size that is 8 nm or more and 20 nm or less are filled with particles constituted by a low-coercivity component having a small particle size that is less than 8 nm, as described above, the number of magnetic powder particles constituted by the low-coercivity component having a small particle size is smaller than the number of magnetic powder particles constituted by the high-coercivity component, and thus the influence of the low-coercivity component on the output characteristics is small, and the particles constituted by the high-coercivity component having a large particle size are dominant in exerting the output characteristics. Furthermore, it seems that the filling effect of filling voids between particles constituted by the high-coercivity component having a large particle size that is 8 nm or more and 20 nm or less with the low-coercivity magnetic powder having a small particle size that is less than 8 nm increases the strength of the entire magnetic layer, and thus the durability of the magnetic layer is improved. That is to say, if P2/P1 is set to 0.25 or more and 0.60 or less, the magnetic layer can achieve both high output characteristics and high durability.

On the other hand, if P2/P1 is less than 0.25, the number of particles constituted by the low-coercivity component having a small particle size with which voids between particles constituted by the high-coercivity component having a large particle size are filled is too small, and thus an increase in the strength of the entire magnetic layer due to an improvement in the filling properties cannot be expected, and the durability of the magnetic layer cannot be improved. As a result, the magnetic layer cannot achieve both high output characteristics and high durability.

Meanwhile, if P2/P1 is more than 0.60, the filling properties of the magnetic powder are improved, and thus the durability of the magnetic layer is improved, whereas the number of particles constituted by the low-coercivity component having a small particle size, which do not contribute to magnetic recording, increases in the magnetic powder, and thus an improvement in the output characteristics of the magnetic layer cannot be expected.

The above-described P2/p1 is preferably 0.26 or more and 0.58 or less, more preferably 0.27 or more and 0.45 or less, and most preferably 0.30 or more and 0.35 or less.

There is no particular limitation on the method for controlling the above-described P2/p1 to 0.25 or more and 0.60 or less, but examples thereof include methods of performing control by changing a mixing ratio between the ε-iron oxide powder constituted by the high-coercivity component and the ε-iron oxide powder constituted by the low-coercivity component, by changing a magnitude of the magnetic field orientation to change the hysteresis curve in the thickness direction, and the like. More specifically, the magnetic powder contained in the magnetic layer preferably has an average particle size of 8 nm or more and 20 nm or less.

The present invention is characterized by causing a magnetic layer to achieve both high durability and high output characteristics, by setting the above-described P2/p1 to the specific range. Accordingly, the above-described P2/p1 is measured not on an ε-iron oxide powder, but on a magnetic layer of a completed magnetic recording medium. Thus, even if a P2/p1 value measured on an ε-iron oxide powder is different from a P2/p1 value measured on a magnetic layer containing the ε-iron oxide powder, it is sufficient that P2/p1 of the magnetic layer is in the range of $0.25 \leq P2/P1 \leq 0.60$.

Furthermore, the spacing of a surface of the magnetic layer measured using a TSA (tape spacing analyzer) after the surface of the magnetic layer has been washed with n-hexane is preferably 5 nm or more and 15 nm or less. If the spacing value is less than 5 nm, the surface of the magnetic layer is too smooth, and the contact area between a magnetic head and the magnetic layer increases, and thus the coefficient of friction increases, which may lower the durability of the magnetic layer. On the other hand, if the spacing value is more than 15 nm, the distance between a magnetic head and the magnetic layer surface is too long, which may lessen the recording/reproducing characteristics. The spacing value is more preferably 7 nm or more and 13 nm or less, and most preferably 8 nm or more and 11 nm or less.

There is no particular limitation on the methods for measuring and controlling the spacing value, but examples thereof include the method described in JP 2012-43495A.

The surface of the magnetic layer is preferably provided with a lubricant layer containing a fluorine-based lubricant or a silicone-based lubricant. If the lubricant layer is provided, the coefficient of friction of the magnetic layer is reduced, and the durability of the magnetic layer is further improved.

The thickness of the magnetic layer is preferably 30 nm or more and 200 nm or less. If the thickness of the magnetic layer is 200 nm or less, the short-wavelength recording characteristics can be improved, and, if the thickness of the magnetic layer is 30 nm or more, a servo signal can be recorded. The saturation magnetization amount of the ε-iron oxide powder used in the present invention is as small as ½ to ⅓ of the saturation magnetization amount of conventionally used ferromagnetic hexagonal ferrite powders, and thus it is necessary to set the thickness of the magnetic layer to 30 nm or more in order to record a servo signal that has a long recording wavelength.

When the servo signal is not to be recorded on the magnetic layer, the thickness of the magnetic layer is preferably 10 nm or more and 50 nm or less. Even if the thickness of the magnetic layer is 10 nm or more and 50 nm or less, data signals can be recorded and reproduced using a highly-sensitive magnetic head such as a tunnel magnetoresistance head (MR head).

Figure 1:
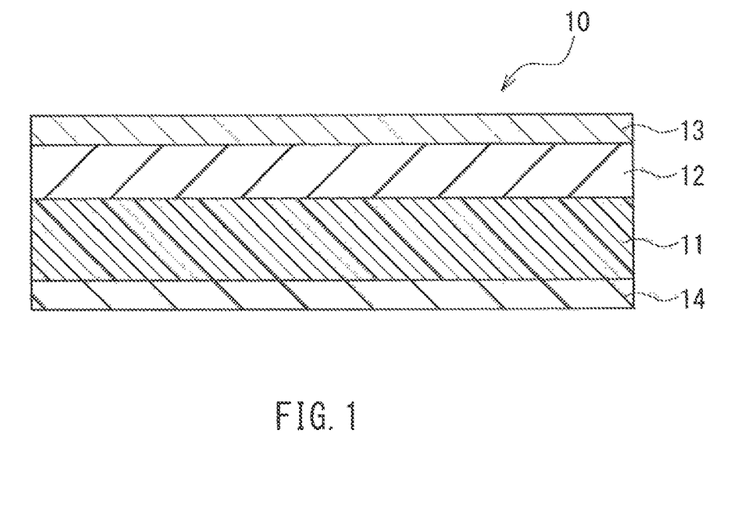
FIG. 1 is a schematic cross-sectional view showing an example of a magnetic recording medium of the present invention.

Hereinafter, an embodiment of the present invention will be described with reference to the drawings. FIG. 1 is a schematic cross-sectional view showing an example of a magnetic recording medium of the present invention.

In FIG. 1, a magnetic recording medium 10 of the present invention is a magnetic tape having a non-magnetic substrate 11, an undercoat layer 12 formed on one of the main faces (on an upper face, in this example) of the non-magnetic substrate 11, and a magnetic layer 13 formed on a main face (an upper face, in this example) of the undercoat layer 12 on the side opposite to the non-magnetic substrate 11. Furthermore, a backcoat layer 14 is formed on a main face (a lower face, in this example) of the non-magnetic substrate 11 on the side where the undercoat layer 12 is not formed.

Magnetic Layer

The magnetic layer 13 contains an ε-iron oxide powder and a binding agent.

The ε-iron oxide powder is preferably constituted by a single phase represented by the general compositional formula ε-$Fe_2O_3$. The reason for this is that, if α-iron oxide or γ-iron oxide is mixed in, the coercivity of the magnetic layer is reduced. However, α-iron oxide or γ-iron oxide may be contained as impurities as long as the coercivity of the magnetic layer is not reduced.

The coercivity of the ε-iron oxide powder is preferably 2500 oersted [Oe] or more. If impurities are contained in the ε-iron oxide powder represented by the general compositional formula ε-$Fe_2O_3$, the coercivity of the ε-iron oxide powder is reduced, and thus it is preferable that impurities are not contained. However, the coercivity of the ε-iron oxide powder can be controlled by substituting part of the Fe site in its crystal with trivalent metal elements such as aluminum (Al), gallium (Ga), rhodium (Rh), indium (In), or the like. Thus, the ε-iron oxide powder may contain metal elements other than iron, as impurities, as long as the coercivity can be kept at 2500 oersted [Oe] or more.

As described above, the ε-iron oxide powder contained in the magnetic layer preferably has an average particle size of 8 nm or more and 20 nm or less. If the average particle size of the ε-iron oxide powder is more than 20 nm, noise in the magnetic recording medium increases in particular in short-wavelength recording, and thus high electromagnetic conversion characteristics may not be obtained.

The average particle size of the ε-iron oxide powder contained in the magnetic layer in the present invention was measured as follows based on a photograph of a surface of the magnetic layer using the ε-iron oxide powder taken by a scanning electron microscope (SEM) "S-4800" manufactured by Hitachi, Ltd. at acceleration voltage: 2 kV, magnification: 10000 times, and observation condition: U-LA100, using 100 particles of the ε-iron oxide powder in one field of view.

The average particle size is determined by calculating an average major axis diameter of the 100 particles if the particles are needle-like in shape, an average maximum plate diameter of the 100 particles if the particles are plate-like in shape, and an average largest diameter of the 100 particles if the particles are spherical or elliptical in shape having a ratio between the major axis diameter and the minor axis diameter of 1 to 3.5.

Furthermore, in the present invention, ε-iron oxide, and γ-iron oxide and α-iron oxide other than the ε-iron oxide can be identified from each other by analyzing their crystal structures using X-ray diffraction.

Conventionally known thermoplastic resins, thermosetting resins, and the like may be used as the binding agent contained in the magnetic layer 13. Specific examples of the thermoplastic resins include a vinyl chloride resin, a vinyl chloride-vinyl acetate copolymer resin, a vinyl chloride-vinyl alcohol copolymer resin, a vinyl chloride-vinyl acetate-vinyl alcohol copolymer resin, a vinyl chloride-vinyl acetate-maleic anhydride copolymer resin, a vinyl chloride-hydroxyl group-containing alkyl acrylate copolymer resin, a polyester polyurethane resin, and the like. Furthermore, specific examples of the thermosetting resins include a phenolic resin, an epoxy-based resin, a polyurethane-based resin, an urea-based resin, a melamine-based resin, an alkyd-based resin, and the like.

The content of the binding agent in the magnetic layer 13 is preferably 7 to 50 parts by mass, and more preferably 10 to 35 parts by mass, with respect to 100 parts by mass of the ε-iron oxide powder.

Furthermore, a thermosetting cross-linking agent that binds to functional groups and the like contained in the binding agent to form a cross-linked structure is preferably used in combination with the binding agent. Specific examples of the cross-linking agent include isocyanate compounds such as tolylene diisocyanate, hexamethylene diisocyanate, and isophorone diisocyanate; reaction products of an isocyanate compound and a compound, such as trimethylolpropane, having a plurality of hydroxyl groups; and various types of polyisocyanate such as condensation products of an isocyanate compound. The content of the cross-linking agent is preferably 10 to 50 parts by mass, with respect to 100 parts by mass of the binding agent.

The magnetic layer 13 may further contain additives such as a polishing agent, a lubricant, a dispersant, and the like, as long as it contains the above-described ε-iron oxide powder and binding agent. A polishing agent and a lubricant are preferably used in view of the durability.

Specific examples of the polishing agent include α-alumina, β-alumina, silicon carbide, chromium oxide, ceric oxide, α-iron oxide, corundum, synthetic diamond, silicon nitride, silicon carbide, titanium carbide, titanium oxide, silicon dioxide, and boron nitride, and among these, a polishing agent having a Mohs' hardness of 6 or more is more preferable. These polishing agents may be used alone or in combination of two or more. The average particle size of the polishing agent is preferably 10 to 200 nm although it depends on the type of polishing agent used. The content of the polishing agent is preferably 5 to 20 parts by mass, and more preferably 8 to 18 parts by mass, with respect to 100 parts by mass of the magnetic powder.

Examples of the lubricant include a fatty acid, a fatty acid ester, and a fatty acid amide. Although the fatty acid may be any of a linear-chain fatty acid, a branched-chain fatty acid, and a cis-trans isomer, a straight-chain fatty acid, which has excellent lubricating ability, is preferable. Specific examples of the fatty acid include a lauric acid, a myristic acid, a stearic acid, a palmitic acid, a behenic acid, an oleic acid, a linoleic acid, and the like. Specific examples of the fatty acid ester include n-butyl oleate, hexyl oleate, n-octyl oleate, 2-ethylhexyl oleate, oleyl oleate, n-butyl laurate, heptyl laurate, n-butyl myristate, n-butoxyethyl oleate, trimethylolpropane trioleate, n-butyl stearate, s-butyl stearate, isoamyl stearate, and butyl cellosolve stearate. Specific examples of the fatty acid amide include palmitic acid amide and stearic acid amide. These lubricants may be used alone or in combination of two or more.

Out of these, fatty acid ester and fatty acid amide are preferably used in combination. In particular, it is preferable to use 0.2 to 3 parts by mass of fatty acid ester and 0.5 to 5 parts by mass of fatty acid amide with respect to the total amount, which is taken as 100 parts by mass, of all the powders, such as the magnetic powder and the polishing agent, in the magnetic layer 13. The reason for this is that a fatty acid ester content of less than 0.2 parts by mass will result in a decreased effect of reducing the coefficient of friction, and a fatty acid ester content of more than 3.0 parts by mass incurs the risk of an adverse effect occurring such as sticking of the magnetic layer 13 to the head. A fatty acid amide content of less than 0.5 parts by mass will result in a decreased effect of preventing seizing, which occurs due to contact between the magnetic head and the magnetic layer 13, and a fatty acid amide content of more than 5 parts by mass will incur the risk of the fatty acid amide excessively bleeding.

Moreover, the magnetic layer 13 may contain carbon black in order to improve the conductivity and the surface lubricity. Specific examples of the carbon black include acetylene black, furnace black, and thermal black. The carbon black preferably has an average particle size of 0.01 to 0.1 μm. An average particle size of 0.01 μm or more will allow for formation of the magnetic layer 13 in which the carbon black is well dispersed. On the other hand, an average particle size of 0.1 μm or less will allow for formation of the magnetic layer 13 that has excellent surface smoothness. Moreover, two or more types of carbon blacks having different average particle sizes may be used, if necessary. The content of the carbon black is preferably 0.2 to 5 parts by mass, and more preferably 0.5 to 4 parts by mass, with respect to 100 parts by mass of the magnetic powder.

The surface roughness of the magnetic layer 13 is preferably less than 2.0 nm, as the centerline average roughness Ra as defined in Japanese Industrial Standards (JIS) B0601. The more the surface smoothness of the magnetic layer 13 improves, the higher the output that can be obtained, but an excessively smooth surface of the magnetic layer 13 will lead to an increase in the coefficient of friction, which in turn decreases the transport stability. Therefore, Ra is preferably 1.0 nm or more.

Figure 2:
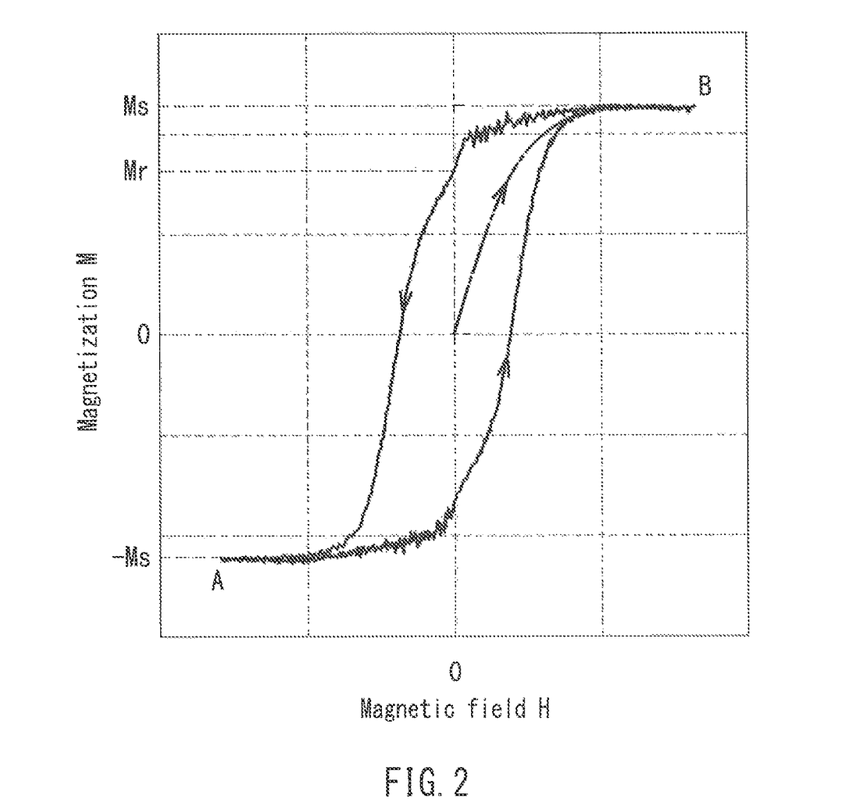
FIG. 2 is a graph showing an example of a hysteresis curve.

Next, the characteristics of the magnetic layer 13 will be described. FIG. 2 is a graph showing an example of a hysteresis curve in the thickness direction of the magnetic layer 13. As shown in FIG. 2, when a magnetic field in a positive direction is applied to the magnetic layer 13 from a state with the magnetic field 0, a saturation magnetization Ms in the positive direction is reached. Subsequently, when a magnetic field in a direction (negative direction) opposite to the positive direction is applied, a saturation magnetization −Ms in the opposite direction (negative direction) is reached. An endpoint at which the saturation magnetization −Ms is reached on the hysteresis curve is taken as a point A. Furthermore, when a magnetic field in the positive direction is applied further from the point A, the saturation magnetization Ms in the positive direction is reached. An endpoint at which the saturation magnetization Ms is reached on the hysteresis curve is taken as a point B. In FIG. 2, Mr refers to residual magnetization, which is magnetization at the magnetic field 0.

Figure 3:
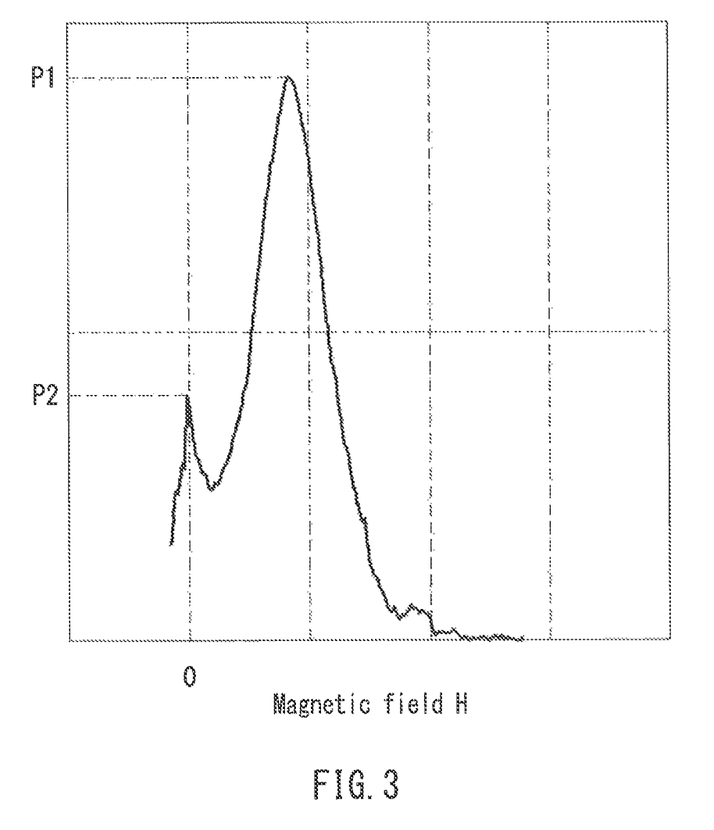
FIG. 3 is a graph showing part of a differential curve obtained by differentiating the hysteresis curve from the point A to the point B in FIG. 2.

FIG. 3 shows part of a differential curve obtained by differentiating the hysteresis curve from the point A to the point B in FIG. 2. In FIG. 3, two or more peaks are present. Out of the peaks, a local maximum of the largest peak in a magnetic field range of +500 oersted [Oe] or more is taken as P1 and a local maximum of the largest peak in a magnetic field range of −500 oersted [Oe] or more and less than +500 oersted [Oe] is taken as P2.

The magnetic layer 13 is set such that a squareness in the thickness direction indicated by Mr/Ms in FIG. 2 is 0.65 or more and that P2/p1 in FIG. 3 is $0.25 \leq P2/P1 \leq 0.60$. Accordingly, it is possible to provide a magnetic recording medium that is excellent in terms of output characteristics and durability.

Lubricant Layer

Although not shown in FIG. 1, as described above, a lubricant layer containing a fluorine-based lubricant or a silicone-based lubricant is provided preferably provided on the magnetic layer 13 in order to reduce the coefficient of friction of the magnetic layer 13 and further improve the durability of the magnetic layer 13. Examples of the fluorine-based lubricant include trichloro fluoroethylene, perfluoropolyether, perfluoroalkyl polyether, perfluoroalkyl carboxylic acid, and the like. Examples of the silicone-based lubricant include silicone oil, modified silicone oil, and the like. These lubricants may be used alone or in combination of two or more. Specific examples of the fluorine-based lubricant include "Novec7100" and "Novec1720" (product name) manufactured by 3M, and specific examples of the silicone-based lubricant include "KF-96L", "KF-96A", "KF-96", "KF-96H", "KF-99", "KF-50", "KF-54", "KF-965", "KF-968", "HIVAC F-4", "HIVAC F-5", "KF-56A", "KF995", "KF-69", "KF-410", "KF-412", "KF-414", and "FL" (product name) manufactured by Shin-Etsu Chemical Co. Ltd., and "BY16-846", "SF8416", "SH200", "SH203", "SH230", "SF8419", "FS1265", "SH510", "SH550", "SH710", "FZ-2110", and "FZ-2203" (product name) manufactured by Dow Corning Toray Co., Ltd. The fluorine-based lubricant or the silicone-based lubricant may be used in combination with a fatty acid, fatty acid ester, fatty acid amide, and the like.

There is no particular limitation on the thickness of the lubricant layer, and it may be, for example, 3 to 5 nm. The thickness of the lubricant layer can be measured from a difference between the values of the spacing between the magnetic recording medium and a transparent body before and after the lubricant layer is washed away with an organic solvent, according to the method using a TSA as in JP 2012-43495A described above.

The lubricant layer can be formed by topcoating the magnetic layer 13 with the lubricant. As described above, the magnetic layer 13 is tightly filled with a magnetic powder constituted by the high-coercivity component having a comparatively large particle size and a magnetic powder constituted by the low-coercivity component having a comparatively small particle size, and thus the lubricant contained in the magnetic layer 13 does not tend to migrate to the surface of the magnetic layer 13, but the lubricant layer can be reliably formed on the surface of the magnetic layer 13 by the topcoating method in which the surface of the magnetic layer is coated with the lubricant.

Undercoat Layer

The undercoat layer 12 having the function of holding the lubricant and the function of mitigating external stress (e.g., pressure from the magnetic head) is preferably provided under the magnetic layer 13. Furthermore, if the undercoat layer 12 is provided, the strength of the magnetic recording medium 10 increases, and thus calender treatment can be performed when forming the magnetic recording medium 10, and the filling properties of the magnetic layer 13 can be improved. The undercoat layer 12 contains a non-magnetic powder, a binding agent, and a lubricant.

Examples of the non-magnetic powder contained in the undercoat layer 12 include carbon black, titanium oxide, iron oxide, and aluminum oxide. Usually, carbon black is used alone, or as a mixture with another non-magnetic powder such as titanium oxide, iron oxide, or aluminum oxide. In order to form a coating having little unevenness in thickness to form the smooth undercoat layer 12, it is preferable to use a non-magnetic powder having a sharp particle size distribution. The average particle size of the non-magnetic powder is, for example, preferably 10 to 1000 nm, and more preferably 10 to 500 nm, from the standpoint of ensuring the uniformity, surface smoothness, and rigidity of the undercoat layer 12 and ensuring the conductivity.

The particle shape of the non-magnetic powder contained in the undercoat layer 12 may be any of spherical, plate-like, needle-like, and spindle-like shapes. With regard to the average particle size of a needle-like or spindle-like non-magnetic powder, the average major axis diameter is preferably 10 to 300 nm, and the average minor axis diameter is preferably 5 to 200 nm. The average particle size of a spherical non-magnetic powder is preferably 5 to 200 nm, and more preferably 5 to 100 nm. The average particle size of a plate-like non-magnetic powder is preferably 10 to 200 nm in terms of the maximum plate diameter. Furthermore, in order to form the undercoat layer 12 that is smooth and has little unevenness in thickness, a non-magnetic powder having a sharp particle size distribution is preferably used.

Examples of the binding agent and the lubricant contained in the undercoat layer 12 include binding agents and lubricants similar to those for use in the magnetic layer 13 described above. The content of the binding agent is preferably 7 to 50 parts by mass, and more preferably 10 to 35 parts by mass, with respect to 100 parts by mass of the non-magnetic powder. Furthermore, the content of the lubricant is preferably 2 to 6 parts by mass, and more preferably 2.5 to 4 parts by mass, with respect to 100 parts by mass of the non-magnetic powder.

The saturation magnetization amount of the ε-iron oxide powder used in the above-described magnetic layer 13 is as small as ½ to ⅓ of the saturation magnetization amount of conventionally used ferromagnetic hexagonal ferrite powders, and thus the undercoat layer 12 is caused to contain a magnetic powder in order to record a servo signal that has a long recording wavelength. Examples of the magnetic powder include a needle-like metallic iron magnetic powder, a plate-like hexagonal ferrite magnetic powder, a granular iron nitride magnetic powder, and the like.

The thickness of the undercoat layer 12 is preferably 0.1 to 3 μm, and more preferably 0.3 to 2 μm. If the thickness is set to this range, the function of holding the lubricant and the function of mitigating external stress can be maintained without unnecessarily increasing the overall thickness of the magnetic recording medium 10.

Non-Magnetic Substrate

A conventionally used non-magnetic substrate for magnetic recording media can be used as the non-magnetic substrate 11. Specific examples of the non-magnetic substrate include films made of polyesters such as polyethylene terephthalate and polyethylene naphthalate, polyolefins, cellulose triacetate, polycarbonate, polyamide, polyimide, polyamide imide, polysulfone, and aramid.

The thickness of the non-magnetic substrate 11, which varies depending on the application, is preferably 1.5 to 11 μm, and more preferably 2 to 7 μm. If the non-magnetic substrate 11 has a thickness of 1.5 μm or more, the film forming properties are improved, and a high strength can be achieved. On the other hand, if the non-magnetic substrate 11 has a thickness of 11 μm or less, an unnecessary increase in the overall thickness will be avoided, and, for example, in the case of a magnetic tape, the recording capacity per reel can be increased.

The Young's modulus of the non-magnetic substrate 11 in the longitudinal direction is preferably 5.8 GPa or more, and more preferably 7.1 GPa or more. If the Young's modulus of the non-magnetic substrate 11 in the longitudinal direction is 5.8 GPa or more, the transport characteristics can be improved. Moreover, in the case of a magnetic recording medium for use in a helical scanning system, the ratio (MD/TD) of the Young's modulus (MD) in the longitudinal direction to the Young's modulus (TI)) in a width direction is preferably 0.6 to 0.8, more preferably 0.65 to 0.75, and even more preferably 0.7. As long as this ratio falls within the above-described range, variations (flatness) in the output of the magnetic head between an entrance side and an exit side of a track can be suppressed. In the case of a magnetic recording medium for use in a linear, recording system, the ratio (MD/TD) of the Young's modulus (MD) in the longitudinal direction to the Young's modulus (TD) in the width direction is preferably 0.7 to 1.3.

Backcoat Layer

In order to, for example, improve the transport characteristics, the backcoat layer 14 is preferably provided on a main face (a lower face, in this example) of the non-magnetic substrate 11 opposite to the main face on which the undercoat layer 12 is formed. The backcoat layer 14 preferably has a thickness of 0.2 to 0.8 μm, and more preferably 0.3 to 0.8 μm. The reason for this is that an excessively small thickness of the backcoat layer 14 will result in an insufficient effect of improving the transport characteristics, and an excessively large thickness will lead to an increase in the overall thickness of the magnetic recording medium 10, which in turn results in a decrease in the recording capacity per reel of magnetic tape.

The backcoat layer 14 preferably contains a carbon black including, for example, acetylene black, furnace black, or thermal black. Usually, a small particle size carbon black and a large particle size carbon black, which are relatively different in particle size, are used in combination. This is because the combined use increases the effect of improving the transport characteristics.

Moreover, the backcoat layer 14 contains a binding agent, and binding agents similar to those for use in the magnetic layer 13 and the undercoat layer 12 can be used as the binding agent. Of these, it is preferable to use a cellulose-based resin and a polyurethane-based resin in combination in order to reduce the coefficient of friction and improve the transport characteristics of the magnetic head.

Preferably, the backcoat layer 14 further contains iron oxide, alumina, or the like in order to improve the strength.

Next, the method for producing the magnetic recording medium of the present invention will be described. The magnetic recording medium of the present invention is produced, for example, as follows. Components for forming each layer and a solvent are mixed to produce a magnetic layer-forming coating material, an undercoat layer-forming coating material, and a backcoat layer-forming coating material. A magnetic layer is formed using a sequential multi-layer coating method in which the undercoat layer-forming coating material is applied to and dried on one face of a non-magnetic substrate to form an undercoat layer, after which the magnetic layer-forming coating material is applied to and dried on the undercoat layer. A backcoat layer is formed by applying and drying the backcoat layer-forming coating material on the other face of the non-magnetic substrate. Subsequently, the entirety is subjected to calender treatment to obtain a magnetic recording medium.

Furthermore, instead of the above-described sequential multi-layer coating method, a simultaneous multi-layer coating method may be used in which the undercoat layer-forming coating material is applied to one face of a non-magnetic substrate, and, before the undercoat layer-forming coating material is dried, the magnetic layer-forming coating material is applied to and dried on the undercoat layer-forming coating material.

There is no particular limitation on the methods for applying the coating materials, but examples thereof include gravure coating, roll coating, blade coating, extrusion coating, and the like.

Hereinafter, the present invention will be described by way of examples, but the present invention is not limited to the following examples. In the description below, "part" means "part by mass".

EXAMPLE 1

Preparation of Magnetic Coating Material

Magnetic coating material components (1) shown in Table 1 were mixed at high speed using a high-speed stirring mixer to prepare a mixture. Next, the obtained mixture was dispersed using a sand mill for 250 minutes, after which magnetic coating material components (2) shown in Table 2 were added to prepare a dispersion. Next, the obtained dispersion and magnetic coating material components (3) shown in Table 3 were stirred using a Disper, and the resulting solution was filtered through a filter to prepare a magnetic coating material.

TABLE 1

| Magnetic coating material components (1) | Part |
|---|---|
| ε-$Fe_2O_3$ magnetic powder (A), average particle size: 18 nm Ratio P2/P1 between local maximums of peaks in differential curve: 0.3 | 50 |
| ε-$Fe_2O_3$ magnetic powder (B), average particle size: 15 nm Ratio P2/P1 between local maximums of peaks in differential curve: 0.7 | 50 |
| Vinyl chloride-based copolymer (containing —$SO_3K$ group), "MR104" manufactured by Zeon Corporation | 13.5 |
| Polyurethane-based resin (containing —$SO_3Na$ group, glass transition point: 70° C.) "UR8200" manufactured by Toyobo Co., Ltd. | 8 |
| Carbon black (average particle size: 75 nm) | 2 |
| Granular alumina powder (average particle size: 80 nm) | 8 |
| Cyclohexanone | 120 |
| Toluene | 120 |

TABLE 2

| Magnetic coating material components (2) | Part |
|---|---|
| Stearic acid n-butyl | 1 |
| Cyclohexanone | 100 |
| Methyl ethyl ketone | 100 |
| Toluene | 100 |

TABLE 3

| Magnetic coating material components (3) | Part |
|---|---|
| Polyisocyanate | 3.5 |
| Cyclohexanone | 7 |
| Toluene | 7 |

Preparation of Undercoat Coating Material

Undercoat coating material components (1) shown in Table 4 were kneaded by a batch-type kneader to prepare a kneaded product. Next, the obtained kneaded product and undercoat coating material components (2) shown in Table 5 were stirred using a Disper to prepare a mixed liquid. Next, the obtained mixed liquid was dispersed using a sand mill for 100 minutes to prepare a dispersion, after which the dispersion and undercoat coating material components (3) shown in Table 6 were stirred using a Disper, and the resulting solution was filtered through a filter to prepare an undercoat coating material.

TABLE 4

| Undercoat coating material components (1) | Part |
|---|---|
| Needle-like iron oxide (average major axis diameter: 110 nm) | 79 |
| Carbon black (average particle size: 17 nm) | 18 |
| Granular alumina powder (average particle size: 140 nm) | 3 |
| Vinyl chloride-hydroxypropyl acrylate copolymer (containing —$SO_3Na$ group) | 9 |
| Polyurethane-based resin (containing —$SO_3Na$ group, glass transition point: 20° C.) "UR8300" manufactured by Toyobo Co., Ltd. | 7.5 |
| Cyclohexanone | 120 |
| Methyl ethyl ketone | 60 |
| Toluene | 60 |

TABLE 5

| Undercoat coating material components (2) | Part |
| --- | --- |
| Stearic acid | 1 |
| Stearic acid n-butyl | 1.5 |
| Cyclohexanone | 120 |
| Toluene | 120 |

TABLE 6

| Undercoat coating material components (3) | Part |
| --- | --- |
| Polyisocyanate | 4.5 |
| Cyclohexanone | 7 |
| Toluene | 7 |

Preparation of Backcoat Layer Coating Material

A mixed liquid obtained by mixing backcoat layer coating material components shown in Table 7 was dispersed using a sand mill for 50 minutes to prepare a dispersion. Then, 15 parts of polyisocyanate was added to the obtained dispersion and the mixture was stirred, and the resulting solution was filtered through a filter to prepare a backcoat layer coating material.

TABLE 7

| Backcoat layer coating material components | Part |
| --- | --- |
| Carbon black (average particle size: 25 nm) "ELFTEX415A10" manufactured by Cabot | 80 |
| Carbon black (average particle size: 300 nm) | 10 |
| α-Hematite powder (average particle size: 100 nm) | 10 |
| Nitrocellulose | 45 |
| Polyurethane-based resin (containing —SO$_3$Na group, glass transition point: 20° C.) "UR8300" manufactured by Toyobo Co., Ltd. | 30 |
| Cyclohexanone | 300 |
| Methyl ethyl ketone | 500 |
| Toluene | 500 |

Production of Magnetic Tape for Evaluation

The undercoat coating material was applied onto a non-magnetic substrate (polyethylene naphthalate film, thickness: 5 μm) such that the thickness of an undercoat layer after calender treatment was 1.1 μm, and was dried at 100° C. to form an undercoat layer. Next, the magnetic coating material was applied onto the undercoat layer such that the thickness of a magnetic layer after calender treatment was 55 nm, and was dried at 100° C. to form a magnetic layer. Subsequently, vertical magnetic orientation treatment was performed while applying an oriented magnetic field (450 kA/m) using a solenoid magnet.

Next, the backcoat layer coating material was applied to the face of the non-magnetic substrate opposite to the face on which the undercoat layer and the magnetic layer were formed, such that the thickness after calender treatment was 0.5 μm, and was dried at 100° C. to form a backcoat layer.

Subsequently, the original roll with the undercoat layer and the magnetic layer formed on the upper face side of the non-magnetic substrate and the backcoat layer formed on the lower face side was subjected to calender treatment using a calender having seven stages of metal rollers at a temperature of 100° C. and a line pressure of 300 kg/cm.

Lastly, the obtained original roll was cured at 60° C. for 48 hours to produce a magnetic sheet. This magnetic sheet was cut into pieces having a width of ½ inches to produce a magnetic tape for evaluation.

EXAMPLE 2

A magnetic tape for evaluation was produced as in Example 1, except that, in the magnetic coating material components (1), the amount of ε-Fe$_2$O$_3$ magnetic powder (A) added was changed to 70 parts, and the amount of ε-Fe$_2$O$_3$ magnetic powder (B) added was changed to 30 parts.

EXAMPLE 3

A magnetic tape for evaluation was produced as in Example 1, except that, in the magnetic coating material components (1), the amount of ε-Fe$_2$O$_3$ magnetic powder (A) added was changed to 20 parts, and the amount of ε-Fe$_2$O$_3$ magnetic powder (B) added was changed to 80 parts.

EXAMPLE 4

A magnetic tape for evaluation was produced as in Example 1, except that, in the magnetic coating material components (1), the amount of ε-Fe$_2$O$_3$ magnetic powder (A) added was changed to 70 parts; the amount of ε-Fe$_2$O$_3$ magnetic powder (B) added was changed to 30 parts, and the amount of carbon black added was changed to 1 part.

EXAMPLE 5

A magnetic tape for evaluation was produced as in Example 1, except that, in the magnetic coating material components (1), the amount of ε-Fe$_2$O$_3$ magnetic powder (A) added was changed to 70 parts, the amount of ε-Fe$_2$O$_3$ magnetic powder (B) added was changed to 30 parts, and the amount of carbon black added was changed to 1 part. Subsequently, the surface of the magnetic tape was top-coated with a lubricant layer by using a method for allowing sliding contact between a band-like impregnated coating cloth impregnated with a silicone-based lubricant and the surface of the magnetic layer of the magnetic tape for evaluation. As the silicone-based lubricant, a mixture of 62.5% by mass of isopropyl alcohol, 17.5% by mass of polyol ester, 20.0% by mass of silicone oil "KF-69" (product name) manufactured by Shin-Etsu Chemical Co. Ltd., and 5.0% by mass of ultraviolet-curable silicone resin "X-12-2441F" (product name) manufactured by Shin-Etsu Chemical Co. Ltd. was used. Furthermore, as the polyol ester, a mixture of 4.0% by mass of butyl stearate (SB), and 7.5% by mass of "Unister H-208BRS" (product name) and 6.0% by mass of "Unister H-445R" (product name) manufactured by NOF Corporation was used.

EXAMPLE 6

A magnetic tape for evaluation was produced as in Example 1, except that, in the magnetic coating material components (1), the amount of ε-Fe$_2$O$_3$ magnetic powder (A) added was changed to 70 parts, the amount of ε-Fe$_2$O$_3$ magnetic powder (B) added was changed to 30 parts, and the amount of carbon black added was changed to 1 part. Subsequently, the surface of the magnetic tape was top-coated with a lubricant layer by using a method for allowing sliding contact between a band-like impregnated coating cloth impregnated with a fluorine-based lubricant and the surface of the magnetic layer of the magnetic tape for evaluation. As the fluorine-based lubricant, a mixture of 62.5% by mass of isopropyl alcohol, 17.5% by mass of polyol ester, and 20.0% by mass of fluorine-based lubricant "Novec7100" (product name) manufactured by 3M was used. Furthermore, as the polyol ester, a mixture of 4.0% by mass of butyl stearate (SB), and 7.5% by mass of "Unister H-208BRS" (product name) and 6.0% by mass of "Unister H-445R" (product name) manufactured by NOF Corporation was used.

EXAMPLE 7

A magnetic tape for evaluation was produced as in Example 1, except that, in the magnetic coating material components (1), the amount of $\varepsilon$-$Fe_2O_3$ magnetic powder (A) added was changed to 70 parts, the amount of $\varepsilon$-$Fe_2O_3$ magnetic powder (B) added was changed to 30 parts, and the amount of carbon black added was changed to 1 part. Subsequently, the surface of the magnetic tape was top-coated with a lubricant layer by using a method for allowing sliding contact between a band-like impregnated coating cloth impregnated with an ester-based lubricant and the surface of the magnetic layer of the magnetic tape for evaluation. As the ester-based lubricant, a mixture of 65% by mass of n-hexane and 35% by mass of polyol ester was used. Furthermore, as the polyol ester, a mixture of 8.0% by mass of butyl stearate (SB), and 15% by mass of "Unister H-208BRS" (product name) and 12% by mass of "Unister H-445R" (product name) manufactured by NOF Corporation was used.

EXAMPLE 8

A magnetic tape for evaluation was produced as in Example 1, except that, in the magnetic coating material components (1), the amount of $\varepsilon$-$Fe_2O_3$ magnetic powder (A) added was changed to 20 parts, the amount of $\varepsilon$-$Fe_2O_3$ magnetic powder (B) added was changed to 80 parts, and the amount of carbon black added was changed to 2.5 parts.

EXAMPLE 9

A magnetic tape for evaluation was produced as in Example 1, except that, in the magnetic coating material components (1), the amount of $\varepsilon$-$Fe_2O_3$ magnetic powder (A) added was changed to 20 parts, the amount of $\varepsilon$-$Fe_2O_3$ magnetic powder (B) added was changed to 80 parts, and the thickness of the magnetic layer was changed to 30 nm.

EXAMPLE 10

A magnetic tape for evaluation was produced as in Example 1, except that, in the magnetic coating material components (1), the amount of $\varepsilon$-$Fe_2O_3$ magnetic powder (A) added was changed to 20 parts, the amount of $\varepsilon$-$Fe_2O_3$ magnetic powder (B) added was changed to 80 parts, and the thickness of the magnetic layer was changed to 200 nm.

EXAMPLE 11

A magnetic tape for evaluation was produced as in Example 1, except that, in the magnetic coating material components (1), the amount of $\varepsilon$-$Fe_2O_3$ magnetic powder (A) added was changed to 20 parts, the amount of $\varepsilon$-$Fe_2O_3$ magnetic powder (B) added was changed to 80 parts, and the amount of carbon black added was changed to 3 parts.

EXAMPLE 12

A magnetic tape for evaluation was produced as in Example 1, except that, in the magnetic coating material components (1), the amount of $\varepsilon$-$Fe_2O_3$ magnetic powder (A) added was changed to 20 parts, the amount of $\varepsilon$-$Fe_2O_3$ magnetic powder (B) added was changed to 80 parts, and the amount of carbon black added was changed to 0.7 parts.

EXAMPLE 13

A magnetic tape for evaluation was produced as in Example 1, except that, in the magnetic coating material components (1), the amount of $\varepsilon$-$Fe_2O_3$ magnetic powder (A) added was changed to 20 parts, the amount of $\varepsilon$-$Fe_2O_3$ magnetic powder (B) added was changed to 80 parts, and the thickness of the magnetic layer was changed to 25 nm.

COMPARATIVE EXAMPLE 1

A magnetic tape for evaluation was produced as in Example 1, except that, in the magnetic coating material components (1), the amount of $\varepsilon$-$Fe_2O_3$ magnetic powder (A) added was changed to 100 parts, the amount of $\varepsilon$-$Fe_2O_3$ magnetic powder (B) added was changed to 0 parts, and the thickness of the magnetic layer was changed to 60 nm.

COMPARATIVE EXAMPLE 2

A magnetic tape for evaluation was produced as in Example 1, except that, in the magnetic coating material components (1), the amount of $\varepsilon$-$Fe_2O_3$ magnetic powder (A) added was changed to 0 parts, the amount of $\varepsilon$-$Fe_2O_3$ magnetic powder (B) added was changed to 100 parts, and the thickness of the magnetic layer was changed to 60 nm.

COMPARATIVE EXAMPLE 3

A magnetic tape for evaluation was produced as in Example 1, except that, in the magnetic coating material components (1), the amount of $\varepsilon$-$Fe_2O_3$ magnetic powder (A) added was changed to 70 parts, the amount of $\varepsilon$-$Fe_2O_3$ magnetic powder (B) added was changed to 30 parts, the amount of carbon black added was changed to 1 part, and an oriented magnetic field was not applied to the magnetic layer.

Next, the following evaluations were performed on the produced magnetic tapes for evaluation.

Magnetic Characteristics

A hysteresis curve of each magnetic tape for evaluation was obtained using a vibrating sample magnetometer "VSM-P7" (product name) manufactured by Toei Industry Co., Ltd. Specifically, the magnetic tape for evaluation was cut into circular pieces having a diameter of 8 mm to obtain a cut sample, and 20 sheets of the cut sample were layered such that the thickness direction of the magnetic tape matched the direction in which an external magnetic field was applied, to obtain a measurement sample. The data plotting mode from the vibrating sample magnetometer was set such that the applied magnetic field was −16 kOe to 16 kOe, the time constant TC was 0.03 sec, the writing step was 6 bits, and the waiting time was 0.3 sec.

Furthermore, in the hysteresis curve in the thickness direction, a point at which, after saturation magnetization in a positive direction was reached by applying a magnetic field in the positive direction to the magnetic layer, saturation magnetization in a direction (negative direction) opposite to the positive direction was reached by applying a magnetic field in the opposite direction (negative direction) was taken as a point A, and a point at which saturation magnetization in the positive direction was reached by applying a magnetic field in the positive direction further from the point A was taken as a point B. The hysteresis curve from the point A to the point B was divided into 2759 points and output to obtain measurement points of the measurement data. Among the measurement points, 35 points in total consisting of one measurement point from the $18^{-th}$ to $2742^{-nd}$ point, and 17 points both before and after that measurement point were subjected to linear least-square approximation, and a slope of each obtained approximation formula was taken as a differential value at that measurement point. A differential curve was obtained from differential values at the measurement points from the $18^{-th}$ to $2742^{-nd}$ points.

From the obtained differential curve, a local maximum P1 of the largest peak in a magnetic field range of +500 oersted [Oe] or more and a local maximum P2 of the largest peak in a magnetic field range of −500 oersted [Oe] or more and less than +500 oersted [Oe] were obtained, and P2/p1 was calculated. Furthermore, a squareness in the thickness direction was obtained from the hysteresis curve in the thickness direction.

Figure 4:
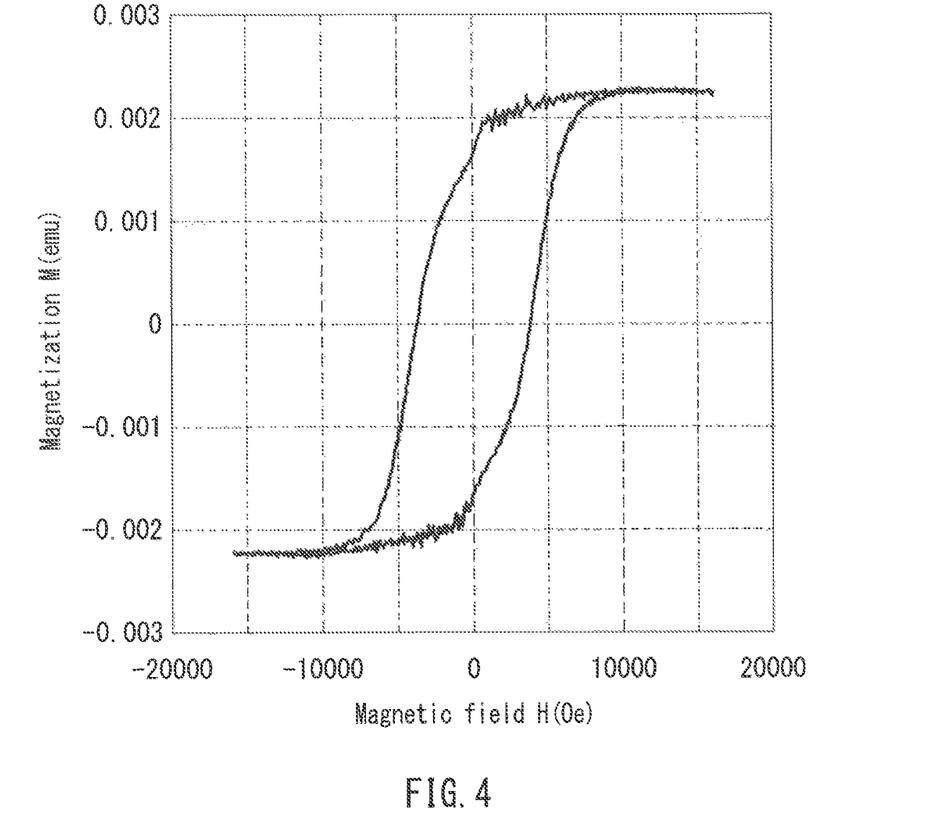
FIG. 4 is a graph showing a hysteresis curve obtained in Example 1.
Figure 5:
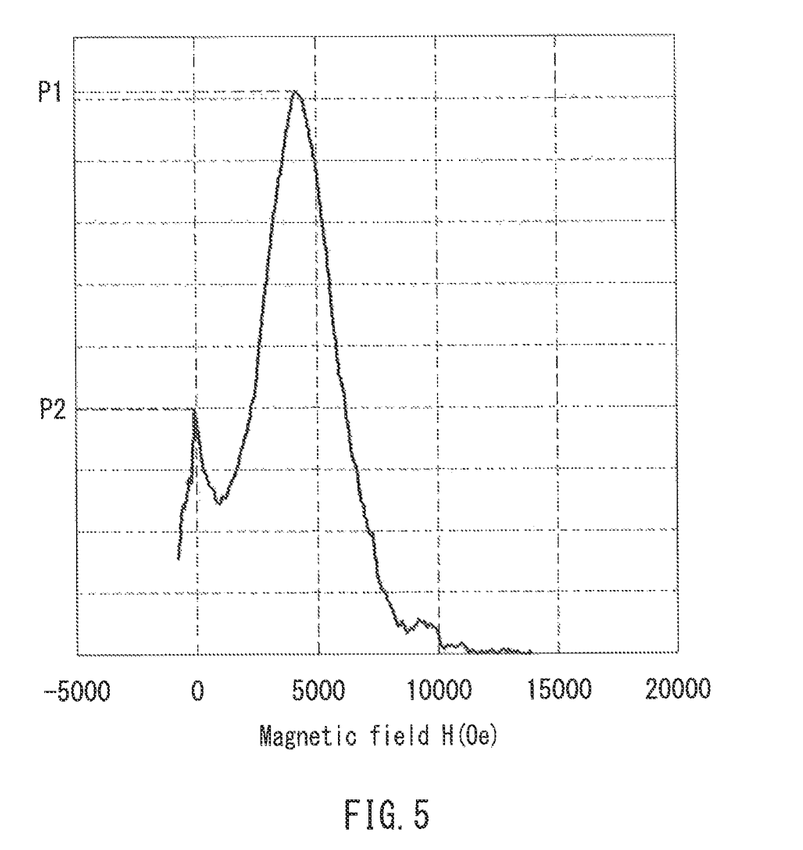
FIG. 5 is a graph showing part of a differential curve of the hysteresis curve obtained in Example 1.

FIG. 4 shows the hysteresis curve in the thickness direction obtained in Example 1, and FIG. 5 shows part of the differential curve of the hysteresis curve in the thickness direction obtained in Example 1.

Spacing of Magnetic Layer

Spacing Sp after the surface of the magnetic layer was washed with n-hexane was measured using a TSA (tape spacing analyzer) manufactured by Micro Physics.

Specifically, the pressure at which the magnetic layer was pressed by a urethane hemisphere against a glass plate was set to 0.5 atm ($5.05 \times 10^4$ N/m). In this state, a predetermined region (240000 to 280000 μm$^2$) of the surface of the magnetic tape for evaluation on the magnetic layer side was irradiated with white light emitted from a stroboscope and transmitted via the glass plate, and light reflected therefrom was received by a CCD via an IF filter (633 nm) and an IF filter (546 nm), and thus an interference fringe image generated by the irregularities in this region was obtained.

Next, this image was divided into 66000 points, and at each point, the distance from the glass plate to the surface of the magnetic layer was obtained. The obtained distances were plotted as a histogram (a frequency distribution curve), which was further processed into a smooth curve by low-pass filter (LPF) processing, and the distance from the glass plate to the surface of the magnetic layer at the peak position was determined as the spacing Sp.

Furthermore, optical constants (phase and reflectance) of the magnetic layer surface used for calculating the spacing were measured using a reflectance spectroscopic thickness meter "FE-3000" manufactured by Otsuka Electronics Co., Ltd., and values near the wavelength 546 nm were used.

Washing with n-hexane was performed by immersing the magnetic tape for evaluation in n-hexane and performing ultrasonic cleaning for 30 minutes at room temperature.

Surface Characteristics of Magnetic Layer

The magnetic layer side of the magnetic tape for evaluation was wrapped at 90° around a round bar made of stainless steel having a diameter of 6 mm, and was caused to slide by 70 mm at a speed of 1200 mm/min in a state where a load of 63.36 g was applied to a tip of the magnetic tape for evaluation. The load during the sliding in the $50^{-th}$ pass was detected by a load cell, and was taken as a measured load, and a coefficient M of friction was calculated by the following formula.

Coefficient $M$ of friction=ln[measured load (g)/63.36 (g)]/0.5π

As a result, it was determined that the surface characteristics of the magnetic layer were "excellent" if the coefficient M of friction was less than 0.35, that the surface characteristics of the magnetic layer were "good" if the coefficient M of friction was 0.35 or more and 0.45 or less, and that the surface characteristics of the magnetic layer were "poor" if the coefficient M of friction was more than 0.45.

Output Characteristics

A loop tester (dynamic TSA apparatus) manufactured by Micro Physics was used. An inductive/GMR composite head having a writing track width of 11 μm and a reading track width of 3.8 μm was attached to the loop tester, and a signal having a recording wavelength of 200 nm was recorded on the magnetic tape for evaluation at a tape speed of 1.5 m/sec. The reproduced signal was amplified by a commercially available read amplifier for MR heads, after which a fundamental wave component output (S) of the signal and integrated noise (N) up to a frequency that was double thereof were measured using a spectrum analyzer "N9020A" manufactured by Keysight Technologies. The output characteristics were evaluated based on a relative value using the S/N value of an IBM LTO6 tape as a reference (0 dB).

Durability

The short-distance transport durability of the magnetic tape for evaluation was evaluated using an LTO6 drive manufactured by Hewlett-Packard. Specifically, after 20000 passes of transport in an environment with a temperature of 23° C. and a relative humidity of 50%, at a tape position of 20 to 50 m, and at a speed of 6.0 m/sec, an S/N value (SNR1) before transport of the magnetic tape for evaluation and an S/N value (SNR2) after transport were measured as in the above-described output characteristics, and the amount of change in ΔSNR (SNR−SNR2) was calculated.

As a result, it was determined that the durability was "excellent" if the ΔSNR was less than 1 dB, that the durability was "good" if the ΔSNR was 1 dB or more and less than 3 dB, and that the durability was "poor" if the ΔSNR was 3 dB or more.

Table 8 shows the evaluation results described above. Table 8 also shows an average particle size of the entire magnetic powder used, calculated by weighting the average particle sizes of the magnetic powders (A) and (B) with the mixed ratio.

TABLE 8

|  | Squareness in thickness direction | P2/P1 | Average particle size (nm) | Sp (nm) | Surface characteristics | Output characteristics (dB) | Durability |
| --- | --- | --- | --- | --- | --- | --- | --- |
| Ex. 1 | 0.72 | 0.43 | 16.5 | 10 | Excellent | 2.2 | Excellent |
| Ex. 2 | 0.75 | 0.26 | 17.1 | 10 | Good | 2.7 | Excellent |
| Ex. 3 | 0.70 | 0.58 | 15.6 | 10 | Excellent | 1.7 | Excellent |
| Ex. 4 | 0.75 | 0.27 | 17.1 | 5 | Good | 3.1 | Good |
| Ex. 5 | 0.75 | 0.27 | 17.1 | 5 | Excellent | 3.1 | Excellent |
| Ex. 6 | 0.75 | 0.27 | 17.1 | 5 | Excellent | 3.1 | Excellent |
| Ex. 7 | 0.75 | 0.27 | 15.6 | 5 | Good | 3.1 | Excellent |

TABLE 8-continued

|  | Squareness in thickness direction | P2/P1 | Average particle size (nm) | Sp (nm) | Surface characteristics | Output characteristics (dB) | Durability |
|---|---|---|---|---|---|---|---|
| Ex. 8 | 0.71 | 0.56 | 15.6 | 15 | Excellent | 1.1 | Excellent |
| Ex. 9 | 0.70 | 0.58 | 15.6 | 10 | Excellent | 1.4 | Excellent |
| Ex. 10 | 0.71 | 0.57 | 15.6 | 10 | Excellent | 1.1 | Excellent |
| Ex. 11 | 0.74 | 0.27 | 15.6 | 18 | Excellent | 1.0 | Good |
| Ex. 12 | 0.76 | 0.26 | 15.6 | 4 | Good | 3.3 | Good |
| Ex. 13 | 0.70 | 0.58 | 15.6 | 10 | Excellent | 0.9 | Excellent |
| Com. Ex. 1 | 0.78 | 0.21 | 18 | 10 | Poor | 3.6 | Poor |
| Com. Ex. 2 | 0.65 | 0.68 | 15 | 10 | Excellent | −0.3 | Excellent |
| Com. Ex. 3 | 0.57 | 0.44 | 17.1 | 5 | Poor | 0.6 | Poor |

It can be seen from Table 8 that all of the surface characteristics, the output characteristics, and the durability are excellent in Examples 1 to 13. However, the output characteristics and the durability were slightly reduced in Example 11 in which Sp was more than 15 nm, and the surface characteristics and the durability were slightly reduced in Example 12 in which Sp was less than 5 nm. In Example 7 in which topcoating with an ester-based lubricant was performed, the surface characteristics were slightly reduced compared with those in Example 5 in which topcoating with a silicone-based lubricant was performed and Example 6 in which topcoating with a fluorine-based lubricant was performed. The output characteristics were slightly reduced in Example 13 in which the thickness of the magnetic layer was less than 30 nm.

On the other hand, the surface characteristics and the durability were poor in Comparative Example 1 in which P2/p1 was less than 0.25, the output characteristics were poor in Comparative Example 2 in which P2/p1 was more than 0.60, and the surface characteristics, the output characteristics, and the durability were poor in Comparative Example 3 in which the squareness was less than 0.65.

As described-above, the magnetic recording medium of the present invention can be used as a magnetic recording medium that is excellent in terms of output characteristics and durability.

The invention may be embodied in other forms without departing from the gist thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A magnetic recording medium, comprising a non-magnetic substrate, and a magnetic layer containing a magnetic powder,
   wherein the magnetic powder is constituted by an ε-iron oxide powder,
   the magnetic layer has a squareness in a thickness direction of 0.65 or more,
   the ε-iron oxide powder comprises a high-coercivity magnetic powder having a large particle size and a low-coercivity magnetic powder having a small particle size, and voids between particles of the high-coercivity magnetic powder having a large particle size are filled with particles of the low-coercivity magnetic powder having a small particle size,
   in a hysteresis curve in the thickness direction of the magnetic layer, in a case where a point at which, after saturation magnetization in a positive direction is reached by applying a magnetic field in the positive direction to the magnetic layer, saturation magnetization in a direction (negative direction) opposite to the positive direction is reached by applying a magnetic field in the opposite direction (negative direction) is taken as a point A, and a point at which saturation magnetization in the positive direction is reached by applying a magnetic field in the positive direction further from the point A is taken as a point B, two or more peaks are present in a differential curve obtained by differentiating the hysteresis curve from the point A to the point B, and
   in a case where, out of the peaks, a local maximum of a largest peak in a magnetic field range of +500 oersted [Oe] or more is taken as P1 and a local maximum of a largest peak in a magnetic field range of −500 oersted [Oe] or more and less than +500 oersted [Oe] is taken as P2, a relationship below is satisfied:

$0.25 \leq P2/P1 \leq 0.60$.

2. The magnetic recording medium according to claim 1, wherein the magnetic powder has an average particle size of 8 nm or more and 20 nm or less.

3. The magnetic recording medium according to claim 1, wherein spacing of a surface of the magnetic layer measured using a TSA (tape spacing analyzer) after the surface of the magnetic layer has been washed with n-hexane is 5 nm or more and 15 nm or less.

4. The magnetic recording medium according to claim 1, further comprising a lubricant layer containing a fluorine-based lubricant or a silicone-based lubricant, on a surface of the magnetic layer.

5. The magnetic recording medium according to claim 1, wherein the magnetic layer has a thickness of 30 nm or more and 200 nm or less.

6. The magnetic recording medium according to claim 1, wherein the high-coercivity magnetic powder having a large particle size has a particle size of 8 nm or more and 20 nm or less, and the low-coercivity magnetic powder having a small particle size has a particle size of less than 8 nm.

* * * * *